Figure 1:
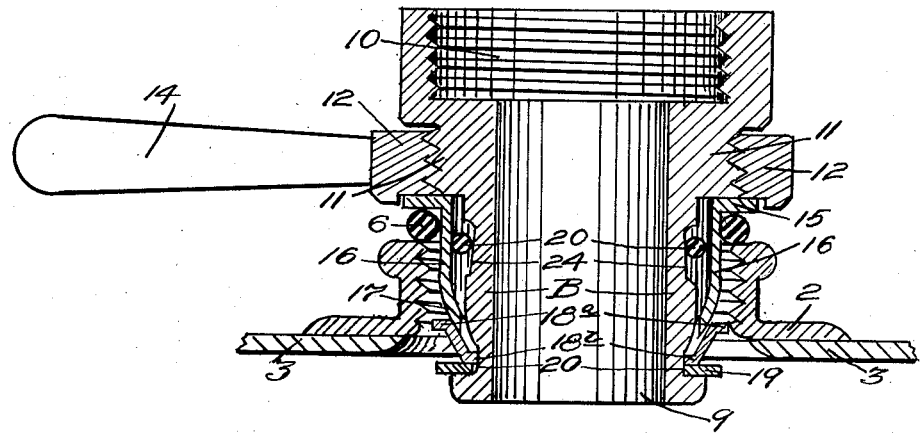

April 1, 1958     K. A. KENNEDY     2,828,982

CAM OPERATED COUPLER TO ENGAGE A THREADED BUNG

Filed Dec. 12, 1955

INVENTOR.
K. A. KENNEDY
BY Thomas Castberg
Atty.

United States Patent Office 2,828,982
Patented Apr. 1, 1958

2,828,982

CAM OPERATED COUPLER TO ENGAGE A THREADED BUNG

Kenneth A. Kennedy, Santa Ana, Calif.

Application December 12, 1955, Serial No. 552,447

1 Claim. (Cl. 285—310)

This invention relates to a coupler whereby a quick, secure, leak-proof connection may be made between a valve or hose and the bung or outlet opening of an oil drum or the like, and especially to improvements on the type of coupler disclosed in my former Patent No. 2,697,619, entitled "Quick Coupler," issued December 21, 1954.

A great proportion of the lubricating oil, gasoline, kerosine, solvents etc. produced in this country are contained in and dispensed from fifty-five gallon steel drums, and seventy-five percent or more of the drums used in the U. S. A. and for export are equipped with an internally threaded bung opening or outlet to receive a valve, hose connection or other attachment which is provided with a standard two inch pipe thread. Inasmuch as a drum is emptied and refilled or in other words, used over and over again, the valve or other dispensing device used must be unscrewed and replaced time and again, causing wear between the threads in the bung opening and on the valve, and when wear takes place even though a rubber gasket may be employed, leakage starts and while it may be a slow drip leak, for instance, with a heavy lubricating oil the leakage may be considerable if the valve is applied to a drum containing kerosine or a solvent. The result is waste, oil-soaked floors and obviously a very considerable fire hazard results; furthermore, as the threads become worn the spout on the valve when the valve is screwed in tight may point to one side or the other and even in an upward direction making it awkward to dispense the content of the drum, and if the valve is turned back to straighten the nozzle leakage is bound to be considerable. It can be pointed out that valves and hose connections of this character require the use of a wrench. Wrenches are often misplaced causing loss of time and sometimes a valve is screwed so tight that it is only removed with great difficulty and further loss of time.

The coupler briefly stated comprises a tubular-shaped body member having one end adapted to be inserted in the outlet or bung opening of a drum, said tubular body member when inserted constituting with the drum outlet an outlet passage from the drum. A split expandable ring is disposed at the lower end of the body member and when expanded grips the interior surface of the drum outlet. The coupler further provides means operable from the upper end of the body member for moving an expanding member into and out of engagement with the expandable ring.

The object of the present invention is to improve the structure of the split expandable ring and the expanding mechanism cooperating therewith.

Figure 2:
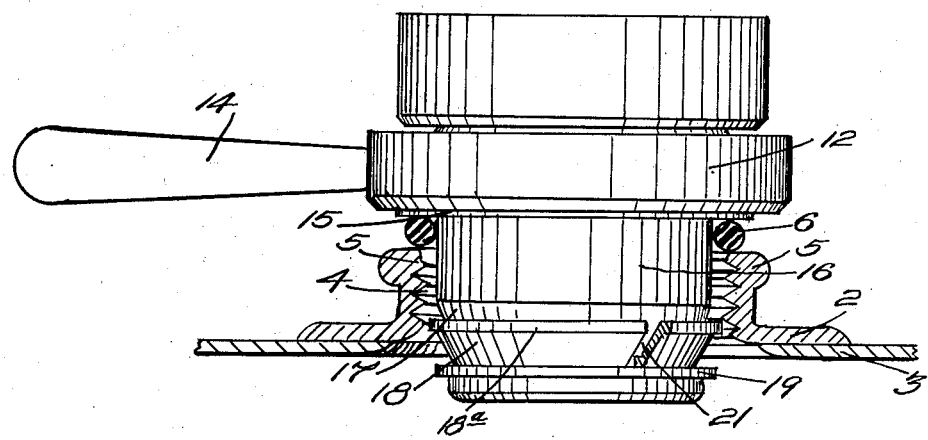

The invention is shown by way of illustration in the accompanying drawings, in which Fig. 1 is a central, vertical, longitudinal section of the coupler showing it inserted in the bung opening of a steel drum or like container, and Fig. 2 is a side elevation of the coupler showing it inserted in the bung opening, but showing the bung opening and sealing gasket in section.

The bung opening or outlet with which the greater proportion of steel drums is provided, consists of a short sleeve or collar having a base flange 2 which is welded or otherwise secured to the body 3 of the drum. The sleeve is internally threaded as at 4 and the upper end is provided with an annular flange 5 to support a compressible gasket 6. The coupler forming the subject matter of the present invention makes no use whatsoever of the internal thread 4, even though the coupler is inserted in the threaded opening, nor does the coupler in any way engage or damage the threads, as a gripping member hereinafter to be described engages the interior surface at a point below the threads.

The coupler proper consists of a tubular-shaped member B the lower end 9 of which is inserted in the outlet opening. The upper end is enlarged and is internally threaded as indicated at 10 to receive a valve, hose connection or the like. Formed on the exterior surface of the body member just below the enlarged upper end is a threaded portion 11 and carried thereby is a nut 12 having a handle 14. Disposed below the lower face of the nut is a flange 15, and formed integral therewith is a sleeve-like member 16 the lower end of which is tapered as at 17. Disposed below the tapered end is an expandable ring 18 which is supported by a snap ring 19 secured in a groove 20 formed at the lowermost end of the body member.

The sleeve with its tapering end 17 will hereinafter be referred to as the expander, while the expandable ring 18 will be referred to as a gripping member. The gripping member as shown is cone-shaped; the taper of the cone being the same as the tapered end 17 of the sleeve, and as the cone-shaped ring is split as indicated at 21 in the manner of a piston ring it will expand radially and circumferentially when the tapered end 17 of the sleeve enters, thus causing the upper edge of the cone-shaped ring to engage and grip the interior surface of the outlet member at a point just below the threaded portion 4 of the outlet. The expandable ring or gripping member is made of semi-steel or a like material and is preferably flanged as shown at 18ª and 18ᵇ to stiffen it and to protect the interior surface which is engaged by the expander or tapered end of sleeve 16.

In actual practice the body B may form an integral part of a valve, hose connection or like appliance, or the appliance may be screwed into the coupler to form a part thereof; the threads 10 being provided for that purpose. If a valve having the coupler formed integral therewith or attached thereto is to be applied to a drum, it is only necessary to insert the end 9 of the coupler in the opening of the outlet and to push downwardly until gasket 6 engages the flange 5, then by grasping the handle 14 of the nut and rotating the nut about the body of the coupler in a clockwise direction, nut 12 will move downwardly on the threads 11, and as the nut engages the flange 15 of the expander 16 it will move downwardly in unison therewith. The tapering end 17 is thus forced into the upper tapering end of the gripping member or ring 18 and this will expand and grip the interior surface of the outlet opening at a point just below the threads 4. Engagement of the gripping member takes place during partial rotation of the nut, in other words, by a partial rotation of the nut the gripping member is first engaged and further or continued rotation will cause compression of the gasket 6 as the coupler as a whole cannot move upwardly after the gripping member has assumed gripping position.

To release or remove the coupler, rotation of the nut is reversed, this reverse rotation releases pressure on the gasket 6 and permits expansion thereof, the expanding force is exerted or directed against the lower face of flange 15 and starts upward movement or extraction of the tapered end 17 and the sleeve, and as the ring or gripping member is made of semi-spring steel or like material, it will contract and force or continue upward movement of the sleeve and expander until the gripping action of the ring is released, when the couple may be removed.

Compression of gasket 6 eliminates any leakage between the exterior surface of the coupler and the annular flange 5 of the outlet opening, however, leakage could take place between the inner surface of the sleeve 16 and the exterior surface of the body member and also through the threads of the nut, but this is prevented by use of the packing ring commonly known as an O ring such as indicated at 23. This ring is mounted in an annular recess formed in the exterior surface of the body member, and the recess presents an inclined surface 24, the purpose of which will hereinafter be described.

In my former Patent No. 2,697,619, heretofore referred to, the flange 15 of sleeve 16 is shown as attached or secured to the nut 12, hence, when the nut was rotated by means of its handle, the sleeve and expander would rotate with it while moving toward or away from the expanding ring or gripping member.

In practice, it was found that the friction produced by rotation of the sleeve and the expander when engaging the expanding ring plus the friction of rotating the sleeve with relation to the O ring 23 was not only excessive, but also resulted in rapid wear of the O ring and the contacting surfaces of the expander and the expansion ring.

In the structure here disclosed, there is no connection between the nut and flange 15, hence, when the nut is rotated in a clockwise direction the flange 15 with the sleeve 16 and expander 17 merely moves longitudinally on the body member thereby eliminating the rotational friction just referred to and the unnecessary wear and tear, further, as the sleeve moves toward the expansion ring, it not only causes the O ring to roll upon itself, but also to become compressed, as it rolls into a narrower space due to the inclined surface 24. When rotation of the nut 12 is reversed and initial expanding movement is imparted to flange 15, the O ring immediately begins to roll back and relieves itself of compression, thus, three different forces are utilized to extract or force the expander upwardly or away from the expanding ring. These forces are, first, the expanding force of the gasket 6, secondly, the unrolling and the expanding force of the O ring, and third, the contracting force of the expansion ring. The combined force of the three members just described is not only ample, but more than sufficient to insure complete expulsion or removal of the expander from the expansion ring, thus permitting complete contraction of said ring or gripping member and ready removal of the coupler from the bung opening of the drum, excessive wear and tear is eliminated, and frictional resistance is reduced to such an extent that rotation of the nut by means of its handle can be accomplished with comparatively little effort.

From the foregoing, it will be noted that by merely inserting the coupler in the bung opening until the gasket 6 seats on the annular flange 5, and then grasping the handle and rotating the nut 12 as previously described, two different operations are consecutively completed, to-wit, first, the gripping member is expanded to gripping position, and secondly, the gasket 6 and the O ring is compressed; the entire operation taking from three to five seconds, depending upon the skill or dexterity of different individuals. No time is lost hunting for a wrench or in trying to unscrew a tight valve; the valve when applied will always assume the right position and as there can be no leakage or waste, oil-soaked floors and fire hazard is eliminated, furthermore, by employing a comparatively coarse and steep-pitched thread between the body and the nut 12, the entire operation of actuating the gripping member and compressing the gasket 6 and the O ring is accomplished in from one-half to three-quarters of a turn of the nut.

By referring to Fig. 1 it should be obvious that the O ring 23 does not only engage the inclined surface 24 of the groove formed in the exterior surface of the body member B, but it also engages the inner surface of the sleeve 16, this engagement is important, as the friction of the O ring against the inner surface of the sleeve secures the sleeve and expander 17 against rotation when the nut is rotated and exerts pressure on the flange 15.

Having thus described my invention, what I desire to claim and secure by Letters Patent is:

In a quick coupler having a tubular-shaped elongated body member open at both ends with a thread and a nut on its upper end, and having a groove formed in its exterior surface adjacent the lower end to receive a split radially and circumferentially expandable metallic ring, and said body member also having a sleeve surrounding it, and interposed between the nut and the expandable ring, and said portion of the body member carrying the sleeve and the expandable ring being insertable in the bung opening of an oil drum, said bung having a flange on its upper end and an interiorally threaded surface, the improvement, which consists in providing an expandable ring cone-shaped to present an inner inclined surface widest at its upper end, providing a complementary cone on the lower end of the sleeve, which enters and expands the expandable ring when the nut on the body member is rotated in one direction, and an annular flange on the upper end of the expandable ring to engage and grip the interior threads of the bung opening, means other than the nut for withdrawing the cone end of the sleeve from the expandable ring when the nut is rotated in the opposite direction, said other means comprising a compressible gasket interposed between the nut and the flange of the bung opening, and a compressible O ring interposed between the sleeve and an upwardly tapering annular surface formed on the exterior surface of the body member.

References Cited in the file of this patent

UNITED STATES PATENTS

| | | |
|---|---|---|
| 351,414 | Warmer | Oct. 26, 1886 |
| 454,922 | Taylor | June 30, 1891 |
| 491,469 | Carver | Feb. 7, 1893 |
| 1,297,719 | Meyers | Mar. 18, 1919 |
| 2,453,813 | Prince | Nov. 16, 1948 |
| 2,697,619 | Kennedy | Dec. 21, 1954 |

FOREIGN PATENTS

| | | |
|---|---|---|
| 201,409 | Germany | Sept. 15, 1908 |